United States Patent
Watanabe et al.

(10) Patent No.: US 9,607,616 B2
(45) Date of Patent: Mar. 28, 2017

(54) METHOD FOR USING A MULTI-SCALE RECURRENT NEURAL NETWORK WITH PRETRAINING FOR SPOKEN LANGUAGE UNDERSTANDING TASKS

(71) Applicant: Mitsubishi Electric Research Laboratories, Inc., Cambridge, MA (US)

(72) Inventors: Shinji Watanabe, Arlington, MA (US); Yi Luan, Seattle, WA (US); Bret Harsham, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 27 days.

(21) Appl. No.: 14/827,669

(22) Filed: Aug. 17, 2015

(65) Prior Publication Data

US 2017/0053646 A1    Feb. 23, 2017

(51) Int. Cl.
*G10L 15/16* (2006.01)
*G10L 15/22* (2006.01)

(52) U.S. Cl.
CPC .............. *G10L 15/16* (2013.01); *G10L 15/22* (2013.01); *G10L 2015/223* (2013.01)

(58) Field of Classification Search
CPC ... G10L 15/065; G10L 15/18; G10L 15/1822; G10L 15/02; G10L 15/063
USPC .................................................. 704/232; 1/1
See application file for complete search history.

(56) References Cited

U.S. PATENT DOCUMENTS

| | | |
|---|---|---|
| 8,442,828 B2 | 5/2013 | Wang et al. |
| 9,239,828 B2 * | 1/2016 | Yao ..................... G06N 3/0472 |
| 2015/0066496 A1 | 3/2015 | Deoras et al. |

OTHER PUBLICATIONS

T. Mikolov, K. Chen, G. Corrado, and J. Dean, "Efficient estimation of word representations in vector space," arXiv preprint arXiv:1301.3781, 3.

R. Sarikaya, G. E. Hinton, and A. Deoras, "Application of deep belief networks for natural language understanding," IEEE/ACM Transactions on Audio, Speech and Language Processing, vol. 22, No. 4, pp. 778-784, 2014.

L. Deng and D. Yu, "Deep convex net: A scalable architecture for speech pattern classification," in Proceedings of the Interspeech, 2011.

G. Mesnil, X. He, L. Deng, and Y. Bengio, "Investigation of recurrent-neural-network architectures and learning methods for spoken language understanding," in Interspeech 2013, Aug. 2013.

(Continued)

*Primary Examiner* — Charlotte M Baker
(74) *Attorney, Agent, or Firm* — Gene Vinokur; James McAleenan; Hironori Tsukamoto

(57) ABSTRACT

A spoken language understanding (SLU) system receives a sequence of words corresponding to one or more spoken utterances of a user, which is passed through a spoken language understanding module to produce a sequence of intentions. The sequence of words are passed through a first subnetwork of a multi-scale recurrent neural network (MSRNN), and the sequence of intentions are passed through a second subnetwork of the multi-scale recurrent neural network (MSRNN). Then, the outputs of the first subnetwork and the second subnetwork are combined to predict a goal of the user.

6 Claims, 7 Drawing Sheets

(56) References Cited

OTHER PUBLICATIONS

K. Yao, B. Peng, G. Zweig, D. Yu, X. Li, and F. Gao, "Recurrent conditional random field for language understanding," in IEEE International Conference on Acoustics, Speech and Signal Processing (ICASSP). 1em plus 0.5em minus 0.4em IEEE, 2014, pp. 4077-4081.

K. Yao, B. Peng, Y. Zhang, D. Yu, G. Zweig, and Y. Shi, "Spoken language understanding using long short-term memory neural networks," in Interspeech 2013, Dec. 2014.

X. Song, X. He, J. Gao, and L. Deng, "Unsupervised learning of word semantic embedding using the deep structured semantic model," MicrosoftTech. Rep. MSR-TR-2014-109, Aug. 2014.

Tomas Mikolov et al. "Context dependent recurrent neural network language model," 2012 IEEE Spoken Language Technology Workshop, Dec. 1, 2012. pp. 234-239. XP055206995.

Luan et al., "Efficient Learning for Spoken Language Understanding Tasks with Word Embedding Based Pre-learning," Sep. 6, 2015, XP055308234, retrieved http://www.merl.com/publications/docs/TR2015-097.pdf (retrieved Oct. 6, 2016).

Harsham et al, "The 7th Biennial Workshop on Digital Signal Processing for in Vehicle Systems, Driver Prediction to Improve Interaction with In-vehicle HMI." Oct. 14, 2015, XP055308231, retrieved http://www.jonathanleroux.org/pdf/Harsham2015DSP10.pdf (retrieved Oct. 6, 2016).

\* cited by examiner

METHOD FOR USING A MULTI-SCALE RECURRENT NEURAL NETWORK WITH PRETRAINING FOR SPOKEN LANGUAGE UNDERSTANDING TASKS

FIELD OF THE INVENTION

This invention relates generally to speech processing, and more particularly to a method for determining a next action to be performed by a spoken dialog system based on a goal expressed in speech from a user during a dialog with the spoken dialog system.

BACKGROUND OF THE INVENTION

As shown in FIG. 1, during a dialog between a user 101 and a conventional spoken dialog system 140, an automatic speech recognizer (ASR) 110 processes user speech 102 to provide input 111 to a spoken language understanding (SLU) module 120. The input to the SLU can be in various forms as well known in the art. Typically, the input is a sequence of words. The words can have associated probabilities. The SLU extracts semantic information from the input. The semantic information represents intentions 121 of the user as expressed in the speech. The intentions can change as the sequence of words is progressively processed. However, when all the words in the sequence have been procesed, a goal, which sums up the intentions is determined. Based on the goal, a dialog manager (DM) 130 determines a next action 131 to be performed by the spoken dialog system.

Two key tasks in spoken dialog are user intention understanding, and user goal estimation. The SLU module extracts the intended meaning (called "intention" hereafter) of the user's speech. The DM determines the next action based on the result of the intentions. i.e., the goal.

The dialog usually includes a sequence of speech from the user and corresponding utterances and actions by the system. Intention and goal estimation takes place over a longer time scale than word understanding. The estimate of the goal can change during the dialog as more information is acquired and the intentions are clarified. Goal estimation performance is important because it can facilitate the user achieving the correct action more quickly.

The goal 121 is the input to the dialog manager 130, which represents the user's intended meaning as extracted from the user speech by the SLU module. Then, the spoken dialog system determines which action to take next based on the result of the intention understanding. The aim is to complete the dialog, which can include multiple user and system utterances/actions in a goal-oriented spoken dialog system.

Intention understanding is framed as a semantic utterance classification problem, while goal estimation is framed as a classification problem of an entire dialog. Conventional intention understanding and goal estimation can use bag of word (BoW) features, or bag of intention features in goal estimation, as inputs to a classification method, such as boosting, support vector machine, and/or logistic regression.

However, one of the problems of applying the BoW features to SLU tasks is that the feature vector tends to be very sparse. Each utterance usually has only a relatively small number of words, unlike the much larger number of words that is typically available during document analysis. Therefore, a BoW feature vector sometimes lacks sufficient semantic information to accurately estimate the user intentions.

One of the most successful neural network approaches is based on deep belief networks (DBNs), which can be viewed as a composition of simple, unsupervised networks, such as stacks of restricted Boltzmann machines (RBMs). Parameters for the RBM are used as initial values to estimate neural network parameters by a back propagation procedure. In the DBN context, the first step of determining initial parameters is called pretraining, and the second step of discriminative network training is called fine tuning.

Conventional neural network prediction and training systems are shown in FIGS. 6 and 7, respectively. As shown in FIG. 6 for prediction, a word sequence 610 is input to a network 620, and processed according to network parameters 630 to produce the user intentions and goal 621.

FIG. 7 shows the corresponding training of the network parameters 630 of the network 620 using pretrained network parameters 625 and training sequence 710.

Because of the success of deep neural network (DNN) and DBN training in ASR and image processing, other neural network architectures have been applied to SLU including Deep Convex Network, Recurrent Neural Network (RNN), and Long Short-Term Memory (LSTM) RNN.

However, in applying those techniques to SLU, one major difficulty is that often there is insufficient training data for a task, and annotating training data can be time consuming. The performance of a neural network trained in low resource conditions is usually inferior because of overtraining.

Word Embedding

Many natural language processing (NLP) systems use the BoW or a "one-hot word" vector as an input, which leads to feature vectors of extremely large dimension. An alternative is word embedding, which projects the large sparse word feature vector into a low-dimensional, dense vector representation.

There are several model families for learning word vectors, including matrix factorization methods, such as latent semantic analysis (LSA), Low Rank Multi-View Learning (LR-MVL), log-bilinear regression model (GloVe), neural network language model (NNLM) based methods, which model on local context window, such as Continuous Bag of Words (CBOW), Skip-gram, and others. Most word vector methods rely on a distance or angle between pairs of word vectors as a primary method for evaluating the intrinsic quality of word representations.

Mikolov et al. use an evaluation scheme based on word analogies, which favors models that produce dimensions of meaning, Mikolov et al., "Efficient estimation of word representations in vector space," arXiv preprint arXiv: 1301.3781, 2013. "GloVe: Global Vectors for Word Representation" shows competing results as CBOW and Skip-gram in word analogy task.

Of the above methods, GloVe, CBOW and Skip-gram are the current state-of-the-art for the word analogy task. GloVe trains on global word-word co-occurrence counts and makes efficient use of global statistics. CBOW predicts the current word based on the context, and the Skip-gram predicts surrounding words given the current word. Mikolov's toolkit 'word2vec,' which implement Skip-gram and CBOW, can train on large-scale corpora very efficiently.

Latent Topic Models

Latent topic models can discover semantic information from a collection of documents. Topic embedding, widely used in information retrieval, treats a document as a mixture of topics and uses a vector to represent the topic distribution. Conventional latent topic models that have been used for SLU include Probabilistic Latent Semantic Analysis (PLSA), latent Dirichlet allocation (LDA), Correlated Topic Model (CTM), and Pachinko Allocation Model (PAM), all of which use Bayesian inference to determine the distribution of latent topics. Most latent variable models are generative models, which can be used in unsupervised training.

LDA has good performance on large-scale corpus and can be trained efficiently. However, because LDA embedding is obtained with an iterative inference procedure, e.g., variational expectation minimization (EM), or sampling method, it is hard to fine-tune the LDA embedding within a neural network framework.

SUMMARY OF THE INVENTION

Spoken language understanding (SLU) tasks such as intention understanding and goal estimation from user speech are essential components in a spoken dialog systems. Neural networks can be used for various SLU tasks. However, one major difficulty of SLU is that the annotation of collected data can be time consuming. Often, this results in insufficient data being available for a task. The performance of a neural network trained in low resource conditions is usually inferior because of overtraining.

To improve the performance, the embodiments of the invention use an unsupervised training method with a large-scale corpora based on word embedding and latent topic models to pretrain the SLU networks.

In order to acquire long-term characteristics over the entire dialog, the embodiments of the invention use a multi-scale recurrent neural network (MSRNN) to predict the user intentions and goal. The MSRNN prediction system uses first and second subnetworks to model using different time scales of spoken dialogs, for instance, those represented by a sequence of words and a sequence of intentions. The time scale used for the subnetwork for words is shorter and more frequent than the time scale used for intentions.

A combination module in the MSRNN prediction system combines the subnetwork output vectors and predicts the user's goal with a score for each prediction category. The multiscale network parameters of this MSRNN prediction system are efficiently estimated by using pretrained subnetwork parameters for each subnetwork during training. The MSRNN based prediction system can reduce the error by about 18% compared to a conventional SLU system.

The pretrained subnetworks use a word embedding network, which converts a one-hot word vector to a continuous vector, for the word-level subnetwork, the MSRNN can be constructed efficiently. The parameters in the MSRNN can be optimized with a conventional back propagation procedure over time, where the parameters of a conventional word embedding network can be used as initial parameters of the MSRNN, or regularization parameters during the optimization process.

DETAILED DESCRIPTION OF THE PREFERRED EMBODIMENTS

The embodiments of our invention provide a method for determining a next action to be performed by a spoken dialog system based on a goal expressed in speech from a user during a dialog.

Fine-Tuning of Linear Input Networks

The method, which can be used for spoken language understanding tasks, uses a discriminative approach to represent intention and goal estimation models. In addition, we can incorporate various information via feature engineering. We use multivariate logistic regression to determine a posterior probability P(g|X) for a classification target g and feature vector X as $$P(g \mid X) = softmax([WX]_g), \tag{1}$$

where $[Y]_g$ means a $g^{th}$ raw element of vector Y. The softmax function is $$softmax(z_m) \triangleq \frac{e^{z_m}}{\sum_k \exp(e^{z_k})}, \tag{2}$$

where z is a vector in the range [0, 1], and m and k are indices.

The weight matrix W is estimated during training, described in greater detail below. For intention prediction, X is a bag-of-words (BoW) feature vector, and g is an intention category. For the goal estimation task, X is a bag-of-intentions feature vector including confidence scores for each predicted intention in the dialog history, and g is a goal category.

Figure 1:
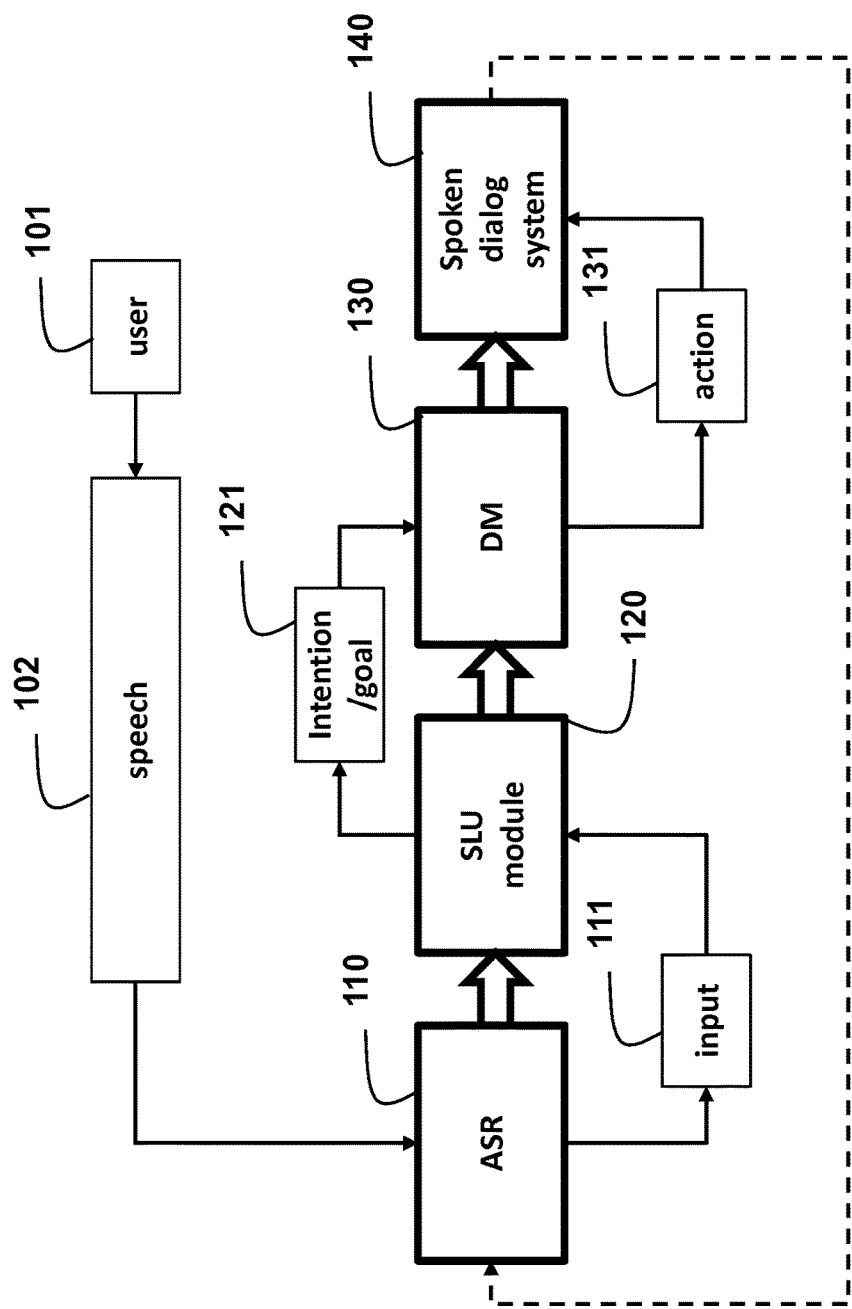
FIG. 1 is flow diagram of a convention computerized spoken dialog system.
Figure 2:
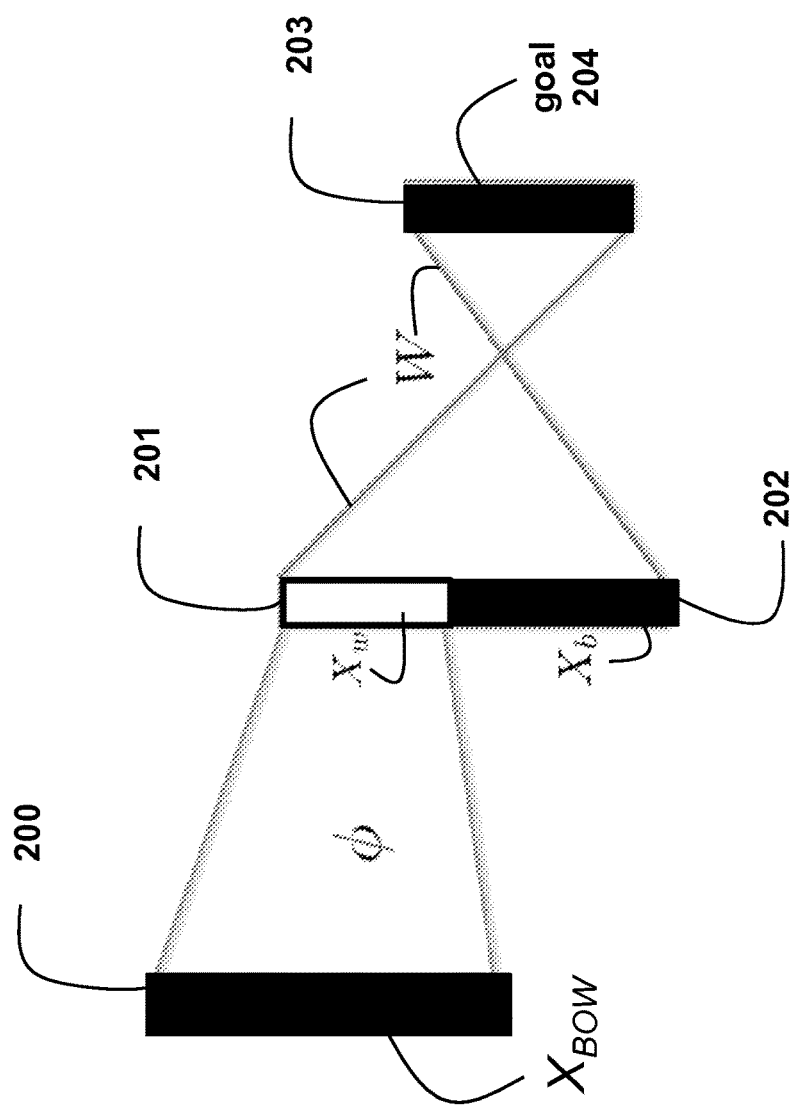
FIG. 2 is a schematic of a shallow feed-forward neural network used by embodiments of the invention.

As shown in FIG. 2, a baseline model can be charaterized as a shallow neural network, with one input layer 200 and one softmax output layer 203 that predict a goal 204.

In order to import a word2vec embedding to the system, we concatenate a word embedding $X_w$ 201 with a baseline feature $X_b$ 202, i.e., $$X = [X_b^T, X_W^T]^T, \text{ see Mikolov et al.} \tag{3}$$

A word sequence $X_w$ is obtained by summing over normalized word2vec features for each word in the turn or sentence:

$$X_w = \sum_{i \in \{1 \ldots T\}} \frac{X_w(i)}{\|X_w(i)\|}, \tag{4}$$

where T is the number of words in the sentence or turn. $X_w(i)$ is the word2vec feature for the $i^{th}$ word in the input sequence pretrained using a large corpus.

We use two structures for fine-tuning. One is a feed-forward structure, which we use to fine-tune an affine transformation obtained from the word2vec embedding. This is equal to adding a linear layer to the shallow baseline network.

Alternatively, GloVe, LR-MVL and LSA are also useful word-embeddings that use different methods to model global word-word co-occurance counts. LSA uses eigen-decomposition matrix factorisation techniques to project a word-word co-occurance matrix to a lower dimension. LR-MVL learns real-valued context-specific word embeddings by performing Canonical Correlation Analysis (CCA) between the past and future views of low rank approximations of the data. LR-MVL works on bigram or trigram co-occurrence matrices. LR-MVK uses longer word sequence information to estimate context-specific embeddings than LSA. GloVe minimizes the square error of word embedding to word-word co-occurrence counts.

The other structure uses a multi-scale recurrent neural network (MSRNN) for different time scales. We apply the MSRNN for the goal estimation, which uses both the ASR result and the predicted intention as input. The affine transformation from the word2vec embedding can be fine-tuned during training of the MSRNN.

Feed-Forward Architecture

As shown in FIG. 2, the feed-forward architecture changes the baseline structure by adding linear hidden layers 201 and 202 between the BoW layer 200 and the output layer 203.

The posterior probability of the intentions given the input features is determined using softmax $$p(g \mid X) = softmax([W[X_I^T, X_W^T]^T]_g), \quad (5)$$

where $$X_w = \phi X_{BoW}, \text{ and} \quad (6)$$

$X_{BoW}$ is the BoW vector obtained from the speech, with dimension of vocabulary size V. $\phi$ is a word embedding matrix initially learned from word2vec with dimensions n×V, where n is the dimension of the word embedding. Eq. 6 is an affine transformation. W is the weight matrix between the hidden layer and the output layer. Fine-tuning is achieved by updating $\phi$ together with W. $X_I$ is a vector with dimension of the number of intention categories, obtained by summing over the N-best intention confidence score. The same $X_I$ is used in the baseline method.

The feed-forward architecture gives us flexibility in adjusting to the task domain, and in fact, gives a better result than pure feature concatenation.

Multi-Scale Recurrent Neural Network (MSRNN)

Figure 3:
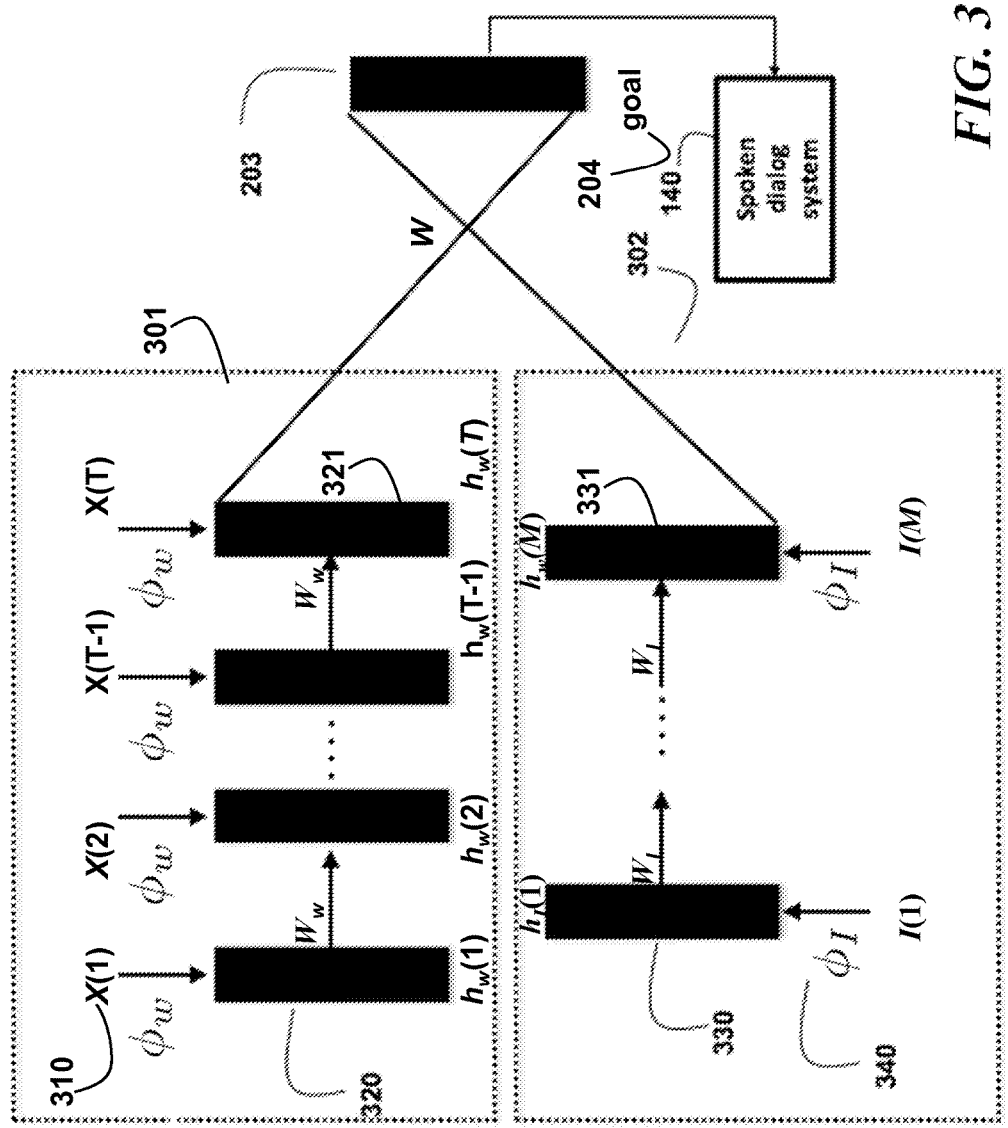
FIG. 3 is a schematic of a multi-scale recurrent neural network (MSRNN) according to embodiments of the invention.

As shown in FIG. 3, the intention understanding and goal estimation has two input sequences: a word sequence 310 and an intention sequence 340. The two sequences are processed on different time scales. The time scale used for the word is shorter and more frequent that the time scale used for the intentions.

A baseline architecture treats input words as a bag-of-words, which ignores the contextual information of the input. Both input sequences, word (310) and intention (340), contain contextual information, and intuitively, a system that acquires this information can perform better than one which does not.

Therefore, we use the MSRNN to model the different time scales represented by word and intention sequences, shown in FIG. 3.

The upper half 301 in this figure represents the shorter first time scale RNN 320, which accepts the feature vector 310 for each word in each utterance, as an entire sequence. The RNN 320 can change state as each new word in the sequence is accepted, shown in FIG. 3 as a new state of the RNN 320 at each input step. The lower half 302 of the figure represents the longer second time scale RNN 330, which accepts a single intention feature 340 vector for each utterance. RNN 330 can change state as each new utterance in the dialog sequence is processed, shown in FIG. 3 as a new state of the RNN 330 at each input step.

The RNN 320 updates much more frequently than the RNN 330, e.g., for each word in the utterance. The goal is predicted at the end of each dialog turn, using the states of RNNs 320 and 330 after that dialog turn has been processed. The last layers 321 and 331 of the word and intention RNNs 320 and 330, are used to predict the goal 204. In other words, the layers 321 and 331, respectively, reflect to the states of the RNN 320 and 330 at the end of each turn.

The above architecture is formulated as follows:

$$p(g \mid X, I) = softmax([W[h_w(T)^T, h_I(M)^T]^T]_g), \quad (7)$$

where, $X = \{X(1), X(2), \ldots, X(T)\}$ 310 and $I = \{I(1), I(2), \ldots, I(M)\}$ 340, T and M are the lengths of word sequence and intention sequence, respectively. $X(t)$ and $I(m)$ are one-hot word and intention vectors, respectively. $h_w(T)$ and $h_I(M)$ are the hidden activation vectors at T and M, which are described below.

The recurrent module of word sequence and intention sequence can be determined as:

$$h_w(t) = sigmoid(X(t)\phi_w + h_w(t-1)W_w), \text{ and} \quad (8)$$

$$h_I(m) = sigmoid(I(m)\phi_I + h_I(m-1)W_I). \quad (9)$$

We use the sigmoid function at the hidden layer defined as:

$$sigmoid(x) = \frac{1}{1 + e^{-x}}, \text{ where} \quad (10)$$

$\phi_w$ and $\phi_I$ are weight matrices for words and intentions between the input and the hidden nodes. $\phi_w$ is initialized by a word embedding matrix, and the back propagation through time is used to finetune $\phi_w$. $W_w$ and $W_I$ are weight matrices between context nodes and hidden nodes. $\phi_I$, $W_w$ and $W_I$ are randomly initialized.

Figure 4:
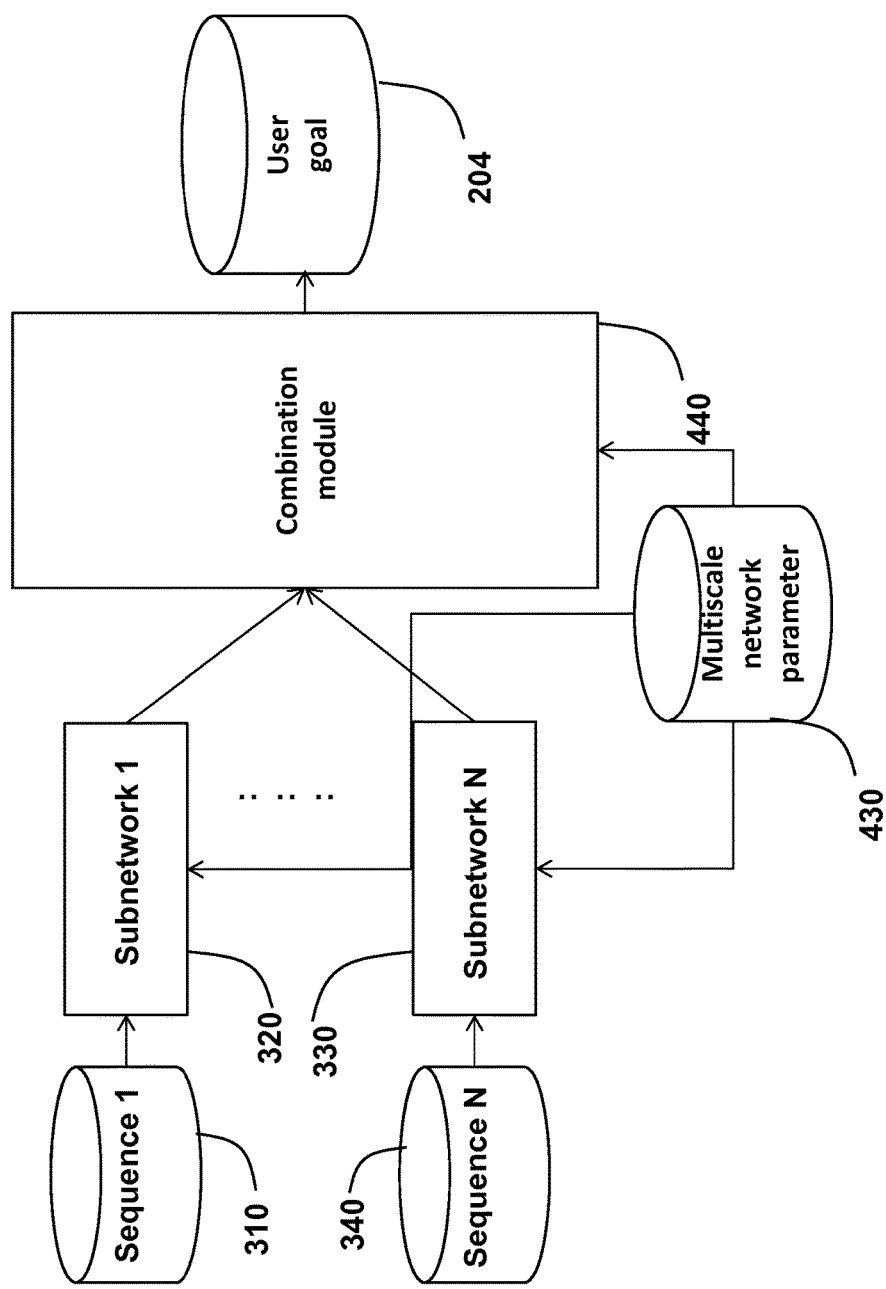
FIG. 4 is a flow diagram of a multi-scale recurrent neural network (MSRNN) based prediction system according to embodiments of the invention.

As shown in FIG. 4, the embodiments of the invention use a multi-scale recurrent neural network (MSRNN) to acquire long-term characteristics over an entire dialog to predict the user intentions and goals in a prediction system.

Input to the prediction system are the word sequence 310 and the intention sequences 340 for corresponding first and second subnetworks 320 and 330. The subnetworks model different time scales of spoken dialogs, for example, those represented by words and intention sequences.

A combination module 440 combines the output vectors of the subnetworks to predict the user's goal 204.

Figure 5:
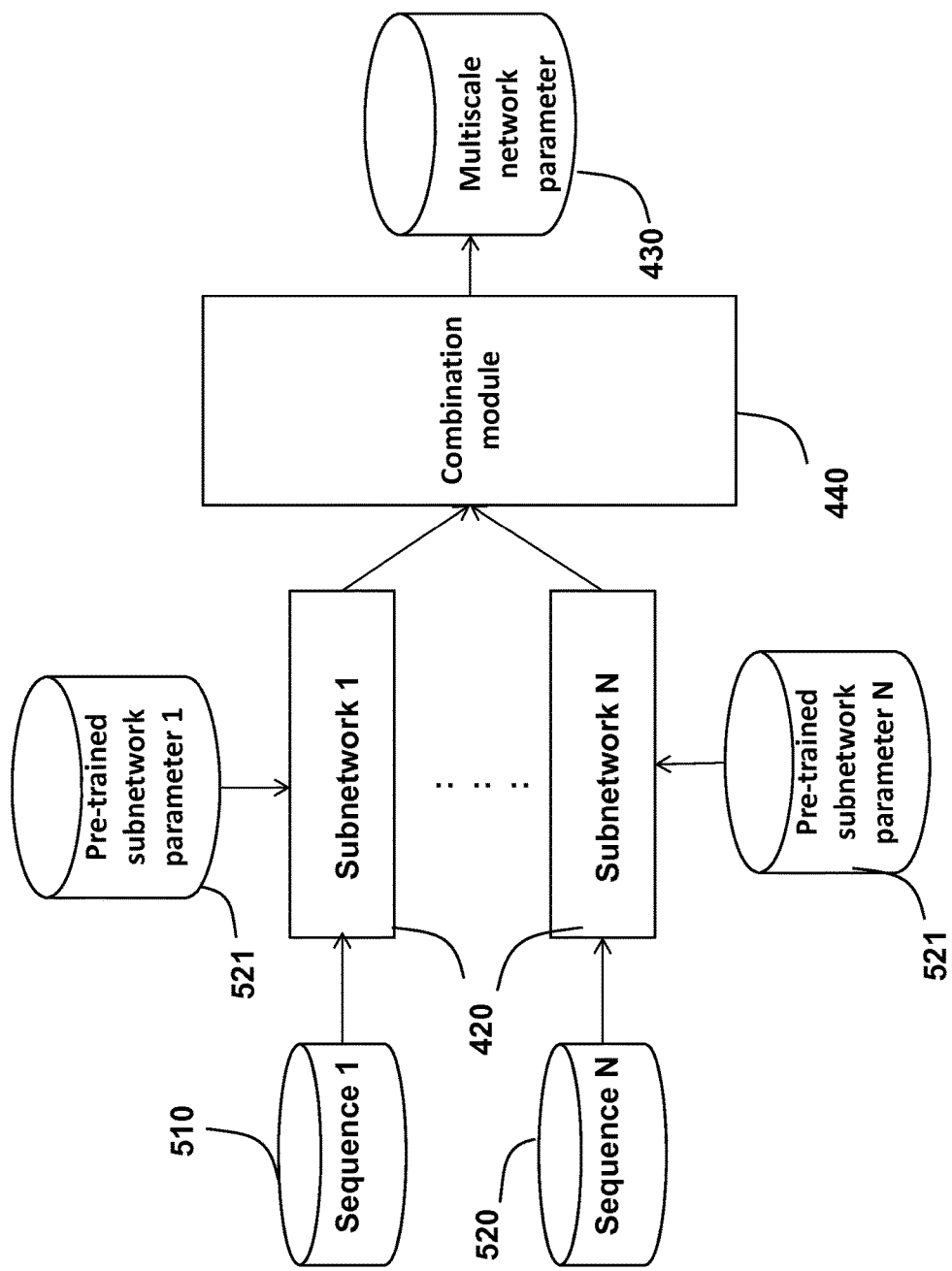
FIG. 5 is a flow diagram of a multi-scale recurrent neural network (MSRNN) based training system according to embodiments of the invention.
Figure 6:
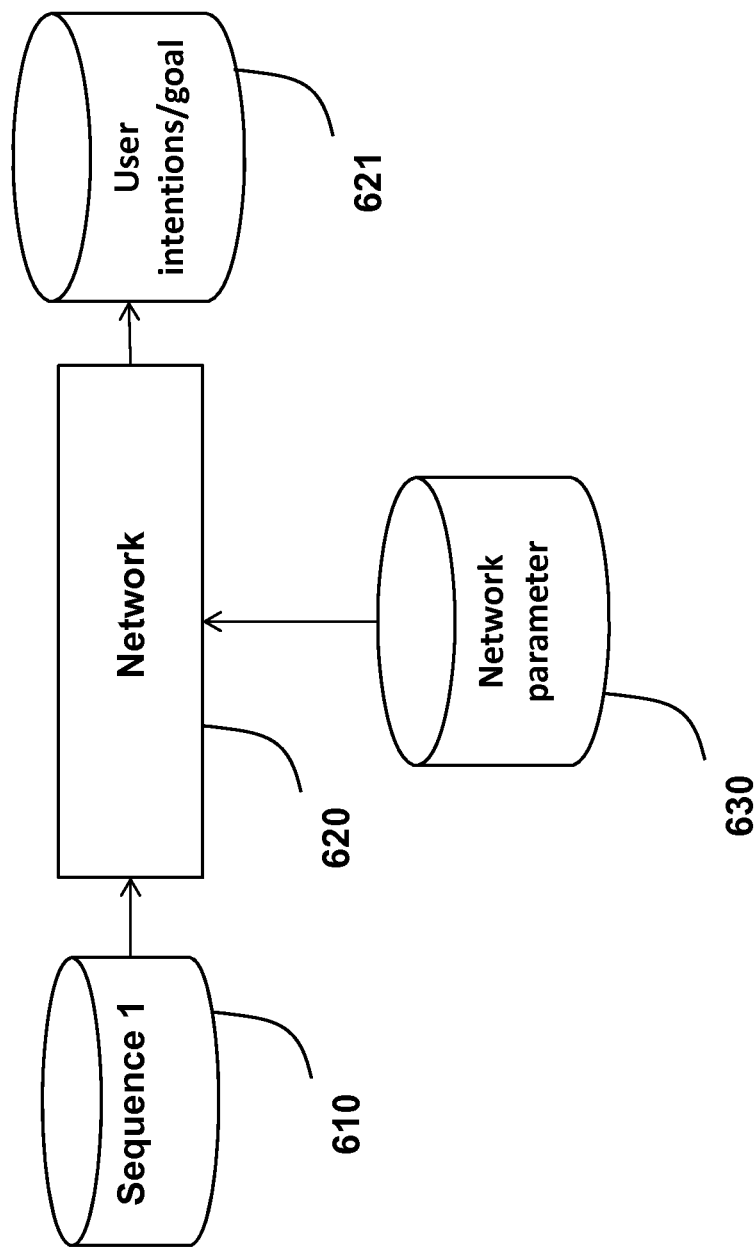
FIG. 6 is a flow diagram of a prediction system for a conventional recurrent neural network.
Figure 7:
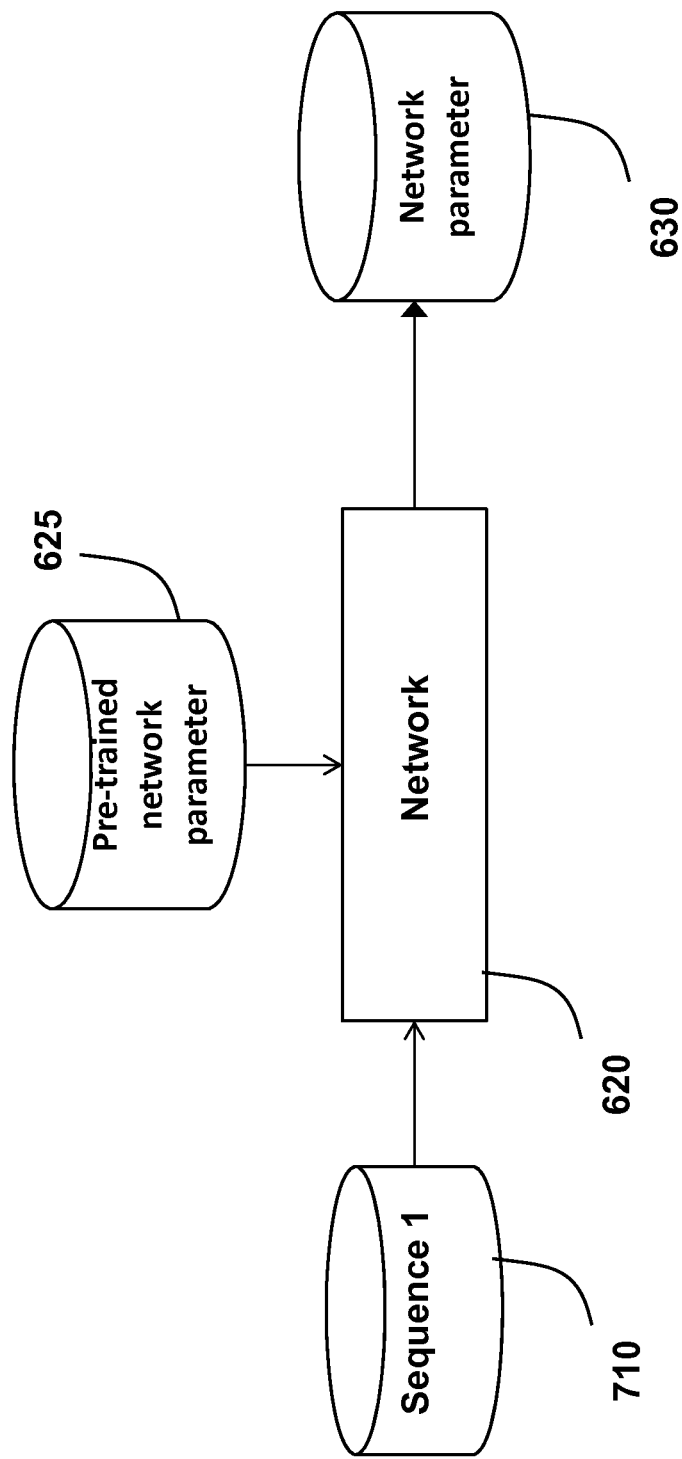
FIG. 7 is a flow diagram of a training system for a conventional recurrent neural network.

As shown in FIG. 5, the multiscale network parameters 430 of this MSRNN prediction system are estimated by using pretrained subnetwork parameters 521 for each subnetwork 420 during training using a training word sequence 510 and an intention sequences 520.

The pretrained subnetworks use a word embedding network, which converts a one-hot word vector to a continuous vector, for the word-level subnetwork, the MSRNN can be constructed efficiently. The parameters in the MSRNN can be optimized with a conventional back propagation procedure over time, where the parameters of a conventional word embedding network can be used as initial parameters of the MSRNN, or regularization parameters during the optimization process.

Effect of the Invention

The embodiments of the invention provide an architecture for efficient learning for low resource SLU tasks. A word embedding is unsupervised and fine-tuned for a specific SLU task. In order to acquire long-term characteristics over an entire dialog, we implement the MSRNN. which uses two subnetworks to model different time scales represented by word and intention sequences.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A spoken language understanding (SLU) method, comprising steps of:
receiving a sequence of words corresponding to one or more spoken utterances of a user;
passing the sequence of words through a spoken language understanding module to produce a sequence of intentions;
passing the sequence of words through a first subnetwork of a multi-scale recurrent neural network (MSRNN);
passing the sequence of intentions through a second subnetwork of the multi-scale recurrent neural network (MSRNN);
combining outputs of the first subnetwork and the second subnetwork to predict a goal of the user, wherein the steps are performed in a processor.

2. The method of claim 1, wherein the sequence of words is an output of an automatic speech recognitions (ASR) system.

3. The method of claim 2, wherein the sequence of words is a probability distribution over a set of words corresponding to the one or more spoken utterances of the user.

4. The method of claim 1, wherein the goal is input to a dialog manager to output an action to be performed by a spoken language dialog system.

5. The method of claim 1, wherein each intention in the sequence of intentions is a probability distribution over a set of intentions that correspond to the one or more spoken utterance of the user.

6. The method of claim 1 wherein the network parameters for the multi-scale recurrent neural network (MSRNN) are trained jointly using separate pre-trained initialization parameters for the first subnetwork and the second subnetwork.